Oct. 13, 1942. W. K. LEWIS ET AL 2,298,798
METHOD FOR PRODUCING GASEOUS OXIDES OF SOLID METALLOIDS
Filed Oct. 1, 1938
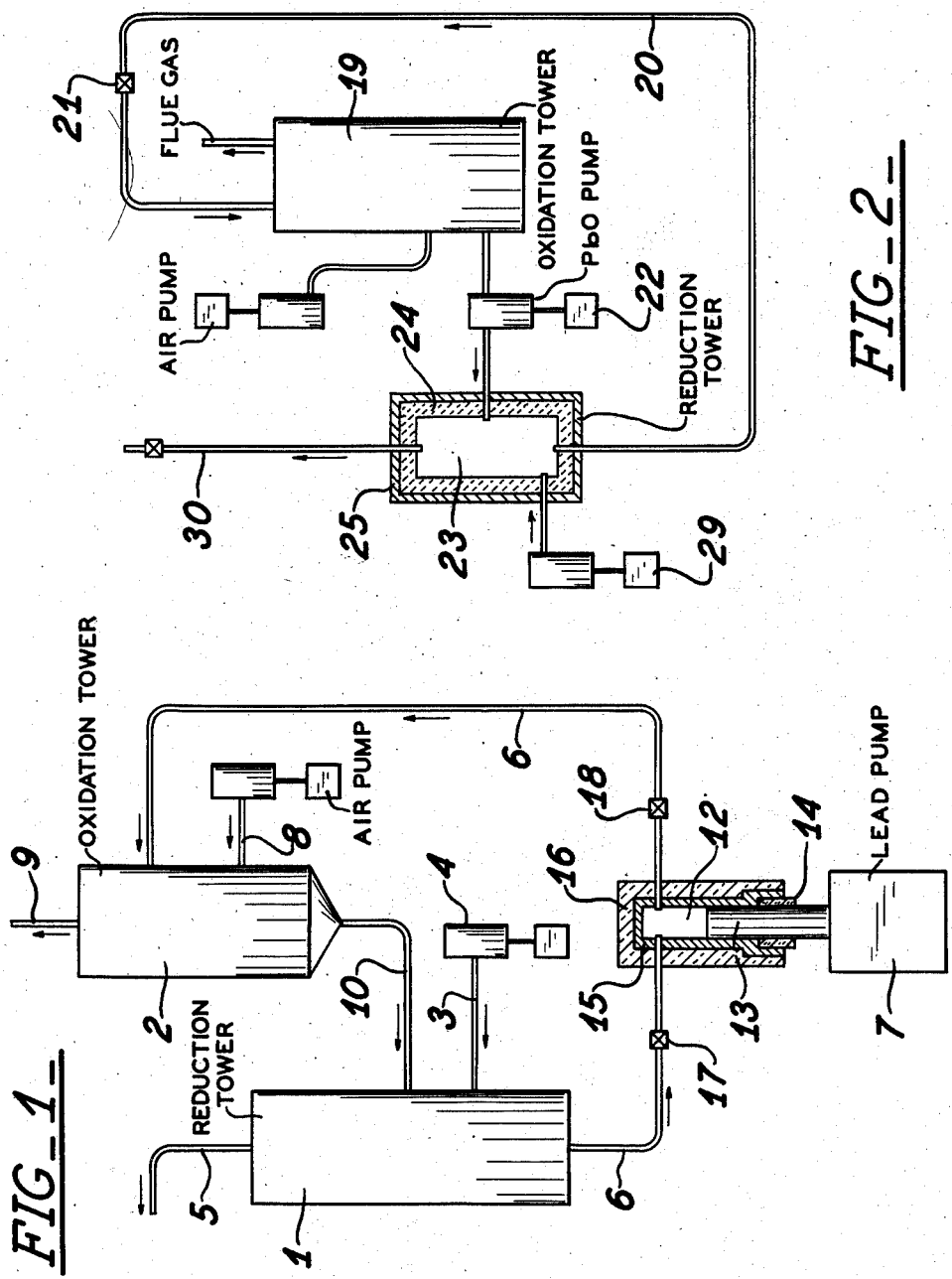

Patented Oct. 13, 1942

2,298,798

UNITED STATES PATENT OFFICE 2,298,798

METHOD FOR PRODUCING GASEOUS OXIDES OF SOLID METALLOIDS

Warren K. Lewis, Newton, Mass., and Thomas V. Moore, Houston, Tex., assignors to Standard Oil Development Company, a corporation of Delaware Application October 1, 1938, Serial No. 232,790

12 Claims. (Cl. 23—150)

The present invention is directed to an improved method and apparatus for the production of gaseous oxides of normally solid metalloids.

According to the present invention gaseous oxides of normally solid metalloids are produced in a substantially pure state by causing a substance containing the metalloid in a reactive state to react with a metal oxide in fluent condition. The metal oxides employed are those which are molten at a temperature below the decomposition temperature of the gaseous metalloid oxide to be produced. The use of oxides of lead and copper is contemplated, the former being the preferred.

In the practice of the present invention, the metalloid-bearing constituent, a hydrocarbon oil having a high carbon-hydrogen ratio or molten sulfur, is introduced into a bath of lead oxide maintained at a temperature between about 900° and 1050° C. The resulting reaction proceeds with a rapid increase in pressure, thereby making it possible to collect the gaseous metalloid oxides at any desired pressure within certain limits. This feature is particularly advantageous for the production of carbon dioxide, for repressuring of oil sands and for the production of dry ice, and in the production of sulfur dioxide for use in the manufacture of liquid sulfur dioxide. When the lead oxide content of the bath has been considerably reduced, the feed of the metalloid bearing constituent is interrupted and the bath is subjected to a blast of air for the purpose of regeneration.

A novel feature of the present invention, made possible by operation in the liquid phase, is the arrangement of a regeneration chamber in liquid flow connection with the reaction chamber, whereby molten metal can run from the reaction chamber to the regeneration chamber where it is continuously regenerated and returned to the reaction chamber. In this way, interruption of the main reaction is avoided whereby the process becomes continuous.

The present invention will be better understood from the following detailed description of the accompanying drawing in which Fig. 1 is a diagrammatic illustration of one form of apparatus suitable for the practice of the present invention; and, Fig. 2 is a similar illustration of an alternative form of apparatus.

Referring to Fig. 1 in detail, numeral 1 designates the main reaction vessel in which the reaction between the metal oxide and the metalloid occurs, and numeral 2 designates the regeneration chamber in which the metal is reconverted into metal oxide. In general, each vessel will contain a mixture of metal oxide and metal, vessel 1 having a preponderance of metal oxide and vessel 2 a preponderance of metal. Each of these vessels is maintained at a temperature between about 900 and 1050° C. Vessel 1 is provided with an inlet 3 to which is connected a pump 4 for tar or molten sulfur, or any other liquid containing a metalloid in a reactive state. It will be apparent that inlet 3 can be so constructed as to be adapted to the introduction of powdered carbon. Vessel 1 is also provided with an outlet 5 for metalloid oxide.

Numeral 6 designates a conduit for conducting lead to be oxidized from the bottom of chamber 1 to chamber 2. Arranged in this conduit is a pump 7 to be hereinafter more specifically described. Air, to which steam may be added for temperature control purposes, is introduced into chamber 2 through pipe 8. The residual gas of combustion is withdrawn from the top of chamber 2 through pipe 9.

The bottom of tower 2 is connected to a point intermediate the middle and the upper end of tower 1 by a line 10. It will be understood that tower 2 is provided with an interior structure which causes the molten lead to flow downwardly against the current of air. If tower 2 is built for batch operation, that is an operation in which a pool of molten lead is subjected to the action of air, it will be apparent that the lead oxide will rise to the surface and pipe 10 will be connected to vessel 2 at a point suitable for the withdrawal therefrom of lead oxide.

Pump 7 comprises a chamber 12 provided with a plunger 13 sealed by a packing gland 14 made of heat resisting material such as asbestos or graphite. Chamber 12 is surrounded by a jacket 15 through which flue gases may be passed in order to keep the lead in the molten state. Jacket 15 is, in turn, covered by insulating material 16. Check valves 17 and 18 are placed in the intake and discharge lines respectively. On the suction stroke of plunger 13 valve 17 is open and valve 18 is closed, causing molten lead to be drawn into chamber 12. On the discharge stroke valve 18 is open and valve 17 is closed, causing the lead to be pumped through line 6 to chamber 2.

As can be seen from the drawing the pumping of litharge is avoided. Of course, if a suitable pump for this purpose is developed, it is apparent that the parts shown can be rearranged so that litharge instead of molten lead will be pumped. The arrangement shown is preferable, however, because the molten lead leaving chamber 1 is at a temperature in the neighborhood of 800° C., whereby there is an allowable drop in temperature of at least 400° C. before the lead will solidify. This allowable drop in temperature simplifies the insulating problem and makes it possible to operate without any danger of plugging due to solidification of the circulating material.

As an alternate method of carrying out this invention, a suitable apparatus for which is shown in Fig. 2, the oxidation of the molten lead is carried out in an oxidation tower 19, to which air is supplied by a blower, and into which lead under pressure from the reduction tower flows through line 20, its rate of flow being regulated by valve 21. The lead oxide in the molten state is picked up by pump 22, and pumped into the reduction tower 23. This tower as well as all other lines and vessels which operate under high pressure are lined with a refractory material 24 inside a metal shell 25. This construction permits the shell to be maintained at a substantially lower temperature than the interior of the reaction chamber, thus resulting in greater strength to withstand high pressure.

Carbon in the form of a high C:H ratio hydrocarbon which may be mixed with powdered carbon is pumped into the vessel by tar pump 29, and the resulting $CO_2$ is withdrawn under pressure through line 30, while the reduced lead flows to the oxidation tower for regeneration.

In the practice of the present invention for the production of carbon dioxide, it is desirable to have a relatively long column of metal oxide in the main reaction chamber and to introduce the carbon containing reagent into the bottom of this column, so as to insure the absence of any carbon monoxide in the exit gas. The lead oxide will also always tend to stay at the top of the column so that there is always provided a zone adjacent the gas outlet end of the column which contains sufficient lead oxide to oxidize any carbon monoxide contained in the gas. Care should be exercised to exclude air from the system since this would introduce into the product undesirable diluent gases.

In the production of sulfur dioxide according to the method of the present invention, the sulfur is preferably supplied as molten sulfur. Also molten metal sulfides, preferably the sulfide of the metal the oxide of which is employed, may be utilized. In order to insure the complete recovery of the sulfur as sulfur dioxide, the circulation of the metal and the metal oxide is so regulated as to provide in the reaction chamber an excess, preferably a large excess, of the metal oxide over that theoretically required to convert all the sulfur employed to sulfur dioxide. One of the desirable features of this procedure is that the provision of this excess of metal oxide cannot lead to the contamination of the product with sulfur trioxide, because by operation in the liquid phase the temperature of operation is always sufficiently high to prevent the formation of sulfur trioxide, i. e. it is usually above the decomposition temperature of sulfur trioxide.

It will be apparent that changes can be made in the above described method without departing from the basic principle of the present invention. For example, in the case of the manufacture of carbon dioxide, when a tar is employed as the source of carbon, it may be desirable to provide a cooling trap for the condensation of any moisture contained in the final product.

All changes within the province of the skilled artisan are contemplated within the scope of the appended claims in which it is intended to claim the present invention as broadly as the prior art permits.

We claim:

1. A method for producing a normally gaseous oxide of a normally solid metalloid of the group consisting of carbon and sulfur in a substantially pure state which comprises introducing a substance containing the metalloid in a reactive state into a fluent, molten body of readily reducible metal oxide which melts at a temperature below the decomposition temperature of the desired metalloid oxide, whereby reaction occurs between the metalloid and the metal oxide yielding the normally gaseous metalloid oxide, removing the resulting gas, continuing the addition of the metalloid containing substance until the metal oxide is substantially reduced, subjecting the reduced metal oxide while still in the fluent state to a blast of air until it is reconverted into the metal oxide, and then resuming the addition of the metalloid-containing substance.

2. A method for producing a normally gaseous oxide of a normally solid metalloid of the group consisting of carbon and sulfur in a substantially pure state which comprises introducing a fluent, molten body of a readily reducible metal oxide which melts below the decomposition temperature of said gaseous oxide and a substance containing the metalloid in a reactive state into a reaction zone whereby a reaction occurs between them with the formation of the normally gaseous oxide, continuously withdrawing normally gaseous oxide from said zone, continuously withdrawing molten reduced metal oxide from such zone, continuously subjecting said reduced metal oxide to oxidation, continuously returning said regenerated metal oxide to said zone, and continuously adding metalloid-containing substance to said zone.

3. A method for producing a normally gaseous oxide of a normally solid metalloid of the group consisting of carbon and sulfur in a substantially pure state which comprises maintaining a column of a readily reducible metal oxide which melts below the decomposition temperature of said gaseous oxide in a fluent, molten state, continuously adding to the lower end of said column a substance containing the metalloid in a reactive state, continuously withdrawing from the upper end of said column the normally gaseous oxide of said metalloid and continuously adding to said column freshly prepared metal oxide.

4. A method for producing a normally gaseous oxide of a normally solid metalloid of the group consisting of carbon and sulfur in a substantially pure state and under pressure which comprises maintaining a column of a readily reducible metal oxide which melts below the decomposition temperature of said gaseous oxide in a fluent, molten condition under pressure, continuously forcing into the lower end of said column a substance containing the metalloid in a reactive state, continuously withdrawing reduced metal oxide from the lower end of said column, continuously withdrawing normally gaseous oxide under pressure from the upper end of said column, and continuously supplying metal oxide under pressure to said column.

5. A method according to the preceding claim in which the pressure on the withdrawn reduced metal oxide is released, the reduced metal oxide is subjected to oxidation in a separate zone, and the metal oxide so produced is placed under pressure and returned to the column of metal oxide.

6. A method for producing a normally gaseous oxide of a normally solid metalloid of the group consisting of carbon and sulfur in a substantially pure state which comprises maintaining a column of a readily reducible metal oxide which melts below the decomposition temperature of said gaseous oxide in a fluent, molten condition, continuously introducing into the bottom of said column a substance containing the metalloid in a reactive state, continuously withdrawing normally gaseous oxide from the top of said column, continuously withdrawing reduced metal oxide from the bottom of said column, conveying said reduced metal oxide to a zone located at a level above said column, subjecting said reduced metal oxide to oxidation in said zone, and conveying the metal oxide so prepared by gravity to said column of metal oxide.

7. A method for producing carbon dioxide which comprises introducing a substance containing carbon in a reactive state into a fluent, molten body of litharge maintained at a temperature below the decomposition temperature of carbon dioxide, withdrawing the resulting carbon dioxide, continuing the addition of said carbon containing substance until the litharge is substantially reduced to lead, subjecting the lead in a fluent state to a blast of air until it is reconverted into litharge and then resuming the addition of the carbon containing substance.

8. A method for producing carbon dioxide which comprises maintaining a column of litharge in a fluent, molten condition, continuously feeding carbon in a reactive state to the bottom of said column, continuously withdrawing carbon dioxide from the top of said column, continuously withdrawing molten lead from the bottom of said column, oxidizing said molten lead and continuously feeding the resulting litharge to said column.

9. A method for producing carbon dioxide which comprises maintaining a column of litharge and lead with the former predominating in a fluent, molten state, maintaining a second column of litharge and lead with the latter predominating in a fluent, molten state, establishing fluid connections between the bottom of the first column and a point intermediate the ends of the second column and between a point near the upper end of the second column and a point above the bottom of the first column, continuously supplying carbon in a reactive state to the bottom of the first column, continuously supplying an oxidizing gas to the bottom of the second column and continuously withdrawing carbon dioxide from the top of the first column.

10. A method for producing sulfur dioxide which comprises introducing a substance containing sulfur in a reactive state into a fluent, molten body of litharge maintained at a temperature below the decomposition temperature of sulfur dioxide, withdrawing the resulting sulfur dioxide, continuing the addition of said sulfur-containing substance until the litharge is substantially reduced to lead, subjecting the lead in a fluent state to a blast of air until it is reconverted into litharge and then resuming the addition of the sulfur-containing substance.

11. A method for producing sulfur dioxide which comprises maintaining a column of litharge in a fluent, molten condition, continuously feeding sulfur in a reactive state to the bottom of said column, continuously withdrawing sulfur dioxide from the top of said column, continuously withdrawing molten lead from the bottom of said column, oxidizing said molten lead and continuously feeding the resulting litharge to said column.

12. A method for producing sulfur dioxide which comprises maintaining a column of litharge and lead with the former predominating in a fluent, molten state, maintaining a second column of litharge and lead with the latter predominating in a fluent, molten state, establishing fluid connections between the bottom of the first column and a point intermediate the ends of the second column and between a point near the upper end of the second column and a point above the bottom of the first column, continuously supplying sulfur in a reactive state to the bottom of the first column, continuously supplying an oxidizing gas to the bottom of the second column and continuously withdrawing sulfur dioxide from the top of the first column.

WARREN K. LEWIS.
THOMAS V. MOORE.